United States Patent [19]
Paeng et al.

[11] Patent Number: 5,406,539
[45] Date of Patent: Apr. 11, 1995

[54] RECORDING METHOD AND APPARATUS USING THE SAME FOR MODULATING RECORDING DATA

[75] Inventors: Sang-ki Paeng, Daejeon; Seong-rho Ko, Suwon, both of Rep. of Korea

[73] Assignee: Samsung Electronics Co., Ltd., Kyungki, Rep. of Korea

[21] Appl. No.: 66,845

[22] Filed: May 26, 1993

[30] Foreign Application Priority Data

May 27, 1992 [KR] Rep. of Korea ............ 92-8991

[51] Int. Cl.⁶ ............ H04N 5/76; G11B 5/09
[52] U.S. Cl. ............ 369/59; 369/60; 360/51
[58] Field of Search ............ 360/59, 40, 41, 42, 360/48, 51, 61, 53; 369/59, 60, 53, 109

[56] References Cited

U.S. PATENT DOCUMENTS

| | | | |
|---|---|---|---|
| 5,103,441 | 4/1992 | Yokogawa | 369/59 |
| 5,111,443 | 5/1992 | Yokogawa | 369/59 |
| 5,206,843 | 4/1993 | Kaburagi | 360/59 |
| 5,216,657 | 6/1993 | Nishiuchi et al. | 369/60 |
| 5,315,402 | 5/1994 | Ito et al. | 369/106 |

Primary Examiner—Donald Hajec
Assistant Examiner—Thomas N. Forbus, Jr.
Attorney, Agent, or Firm—Lowe, Price, LeBlanc & Becker

[57] ABSTRACT

An apparatus for recording data having two transition states consisting of leading and trailing edges on the tracks of a disc rotating at a predetermined angular velocity via a head, includes a circuit for generating a plurality of modulated data whose leading edge transitions are synchronized with respect to a transitional state of the recording data and whose trailing edge transitions are delayed with respect the opposite transitional state of the recording data, according to the respective predetermined delay characteristics; a circuit for selecting one of the plurality of delayed data generated from the delayed data generating circuit according to the positions at which the data is to be recorded; and a circuit for modulating the data according to the delayed data selected by the selecting circuit and providing the modulated data to the head.

9 Claims, 3 Drawing Sheets

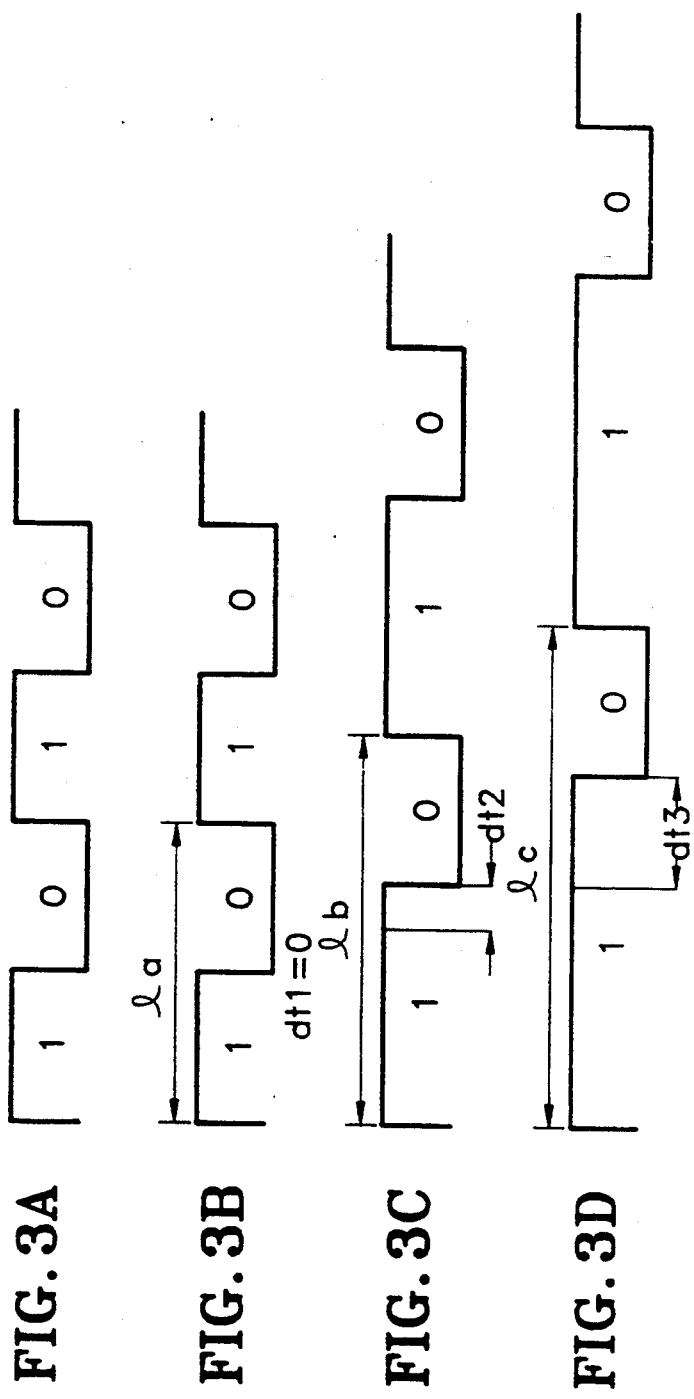
FIG. 3A
FIG. 3B
FIG. 3C
FIG. 3D
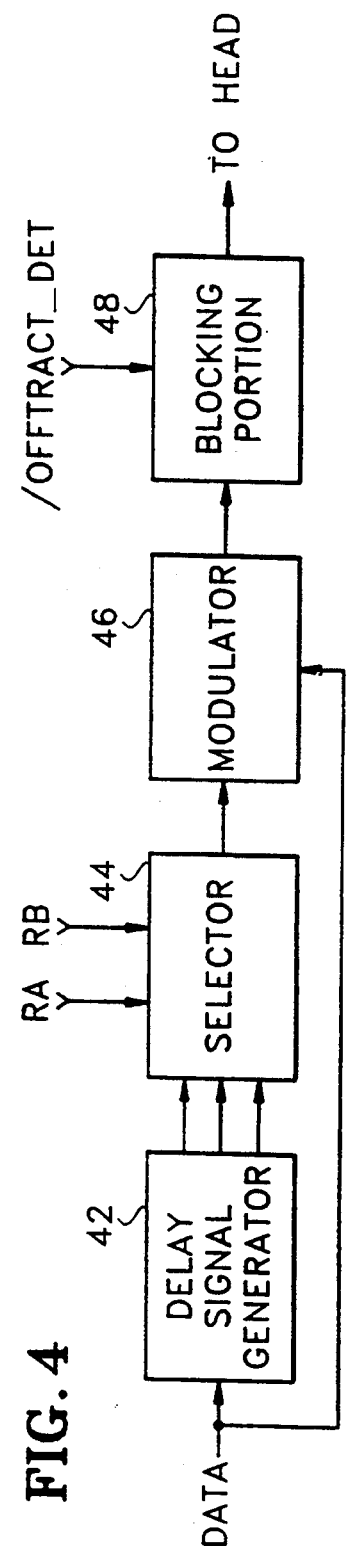
FIG. 4

RECORDING METHOD AND APPARATUS USING THE SAME FOR MODULATING RECORDING DATA

BACKGROUND OF THE INVENTION

The present invention relates to a recording method and apparatus using the same for modulating recording data in such digital recorders as a floppy disc recorder, hard disc recorder, optical disc recorder or magneto-optical disc recorder.

In a constant-angular-velocity (CAV) type magneto-optical recorder/reproducer, the relative linear velocity of a head with respect to a disc is varied according to the head position. If the relative linear velocity is varied, the carrier-to-noise (C/N) ratio decreases when approaching the periphery of the disc. To solve this problem, in a conventional magneto-optical disc recorder, according to the change in head position, the power applied to a laser diode is controlled to improve the C/N ratio.

However, in such a write-power controlling method, controlling the power the laser diode is difficult and the associated circuitry is complicated.

SUMMARY OF THE INVENTION

Therefore, it is the first object of the present invention to provide a recording method for improving the C/N ratio of recording data according to the change of the relative linear velocity of a head and disc, in a method of writing a digital signal on a disc which rotates at a predetermined angular speed.

It is the second object of the present invention to provide an apparatus for modulating recording data which improves the C/N ratio of recording data according to the change of the relative linear velocity of a head and disc, in an apparatus for writing a digital signal on a disc which rotates at a predetermined angular speed.

To accomplish the first object of the present invention, there is provided, in a method for writing digital data based on two states which are opposite to each other and are formed on a disc rotating at a predetermined angular velocity, a method comprising the recording data modulating step of adjusting the composition rate of the two states in accordance with the distance from the center of disc to the portion in which the digital data is written.

To accomplish the second object of the present invention, in an apparatus for recording data having two transition states consisting of leading and trailing edges on the tracks of a disc rotating at a predetermined angular velocity via a head, an apparatus for modulating recording data comprising: a delay data generating circuit for generating a plurality of modulated data whose leading edge transitions are synchronized with respect to a transitional state of the recording data and whose trailing edge transitions are delayed with respect to the opposite transitional state of the recording data, according to the respective predetermined delay characteristics: a selecting circuit for selecting one of the plurality of delayed data generated from the delayed data generating circuit according to the positions at which the data is to be recorded; and a modulating circuit for modulating the data according to the delayed data selected by the selecting circuit and providing the modulated data to the head.

BRIEF DESCRIPTION OF THE DRAWINGS

The above objects and advantages of the present invention will become more apparent by describing in detail a preferred embodiment thereof with reference to the attached drawings in which:

FIGS. 3A, 3B, 3C and 3D illustrate a concept of a method of modulating recording data according to the present invention;

FIG. 4 is a block diagram of an apparatus for modulating recording data according to the present invention.

DETAILED DESCRIPTION OF THE INVENTION

The present invention can be employed in CAV-type disc recorders such as a floppy disc recorder, hard disc recorder, optical disc recorder or magneto-optical disc recorder. Here, however, the case of a digital signal indicating minimum information being written on the magneto-optical disc will be explained for convenience. The minimum information consists of a single high-logic bit "1" followed by a single low-logic bit "0."

Figure 1:
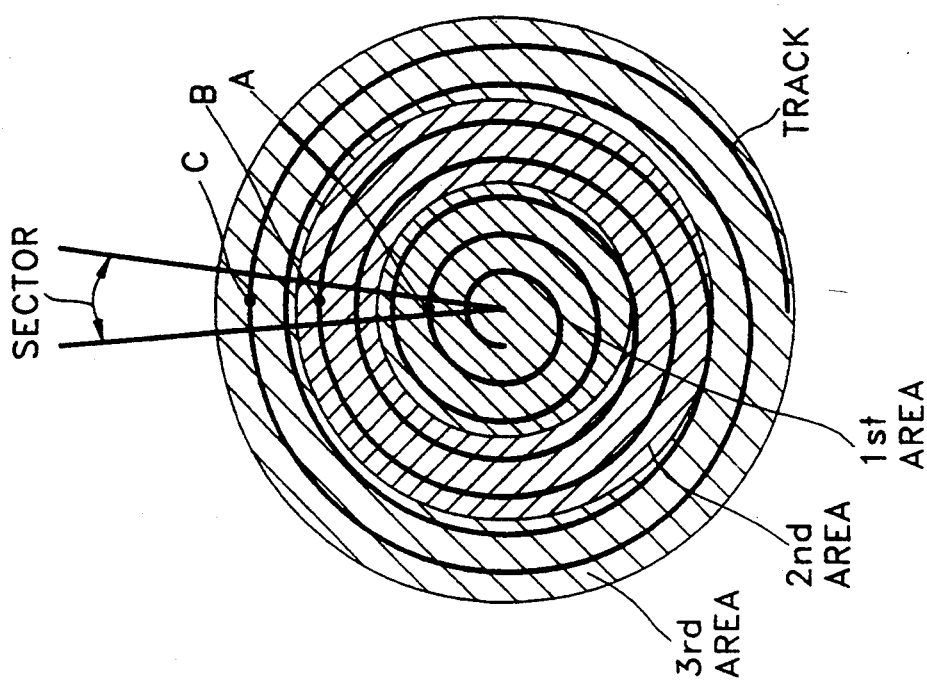
FIG. 1 shows a magneto-optical disc.

As shown in FIG. 1, in the magneto-optical disc, data is recorded along a spiral track in units of sectors. Equal amounts of data are recorded on each sector. For this, pits which correspond to the above minimum information being recorded in outer sectors are longer than those of the more inward tracks.

Figure 2A:
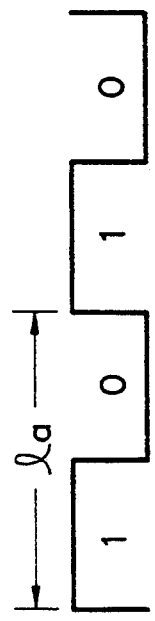
FIGS. 2A, 2B and 2C show data to be recorded in various portions of a disc by a conventional method.
Figure 2B:
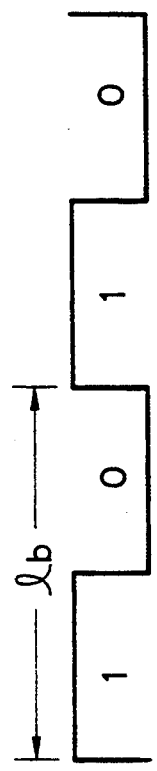
Figure 2C:
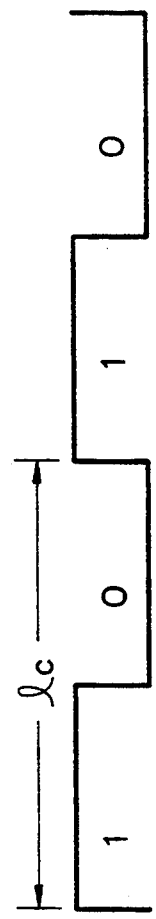

FIGS. 2A, 2B and 2C show recording data of a point A of the first area (see FIG. 1), a point B of the second area and a point C of the third area, respectively. Here, it can be seen that the duty factors of the data to be recorded at points A, B and C are constant, while their respective lengths 1a, 1b and 1c along a given sector (FIG. 1) vary.

In the CAV-type magneto-optical disc recording/reproducing apparatus, with the relative linear velocity of head with respect to disc varying according to head position, the C/N ratio during recording and reading falls off as the head moves toward the periphery of the disc. In the conventional method, as the head moves toward the periphery of the disc during recording, the output of a laser diode provided in the head is increased so as to maintain a constant C/N ratio. This method requires an automatic laser power controller (ALPC) for controlling the output of the laser diode according to the distance between the center of the disc and the head. However, the implementation of such an ALPC is difficult to achieve.

FIGS. 3A, 3B, 3C and 3D illustrate the concept of the recording method of the present invention, in which data to be recorded on respective portions of a disc (as in FIG. 1) is modulated such that the duty factors thereof are different from one another. In FIG. 3A, the recording data is not modulated and has a 50% duty factor. In FIGS. 3B, 3C and 3D, the recording data signals are modulated so as to have 50%, 62.5% and 75% duty cycles, respectively. FIGS. 3B, 3C and 3D suppose that the magneto-optical disc is divided into three areas along a radius. The samples of the modulated recording data of FIGS. 3B, 3C and 3D are formed by delaying the point at which the recording data (shown in FIGS. 2A, 2B and 2C) transits from a logic "1" to a logic "0." by delay periods dt1, dt2 and dt3, respectively.

Referring to FIG. 4, the modulating apparatus of the present invention comprises a delay signal generator 42 for generating a plurality of delayed data whose leading edge transitions are synchronized with respect to leading edge transitions of the recording/input data and whose trailing edge transitions are delayed with respect to the opposite transitional state of the recording data, according to the respective predetermined delay characteristics, a selector 44 for selecting one of the plurality of delayed data generated from delay signal generator 42 according to the positions at which the recording data is to be written, a modulator 46 for modulating the recorded data according to the delayed data selected by selector 44 and providing the modulated data to the head, and a blocking portion 48 for blocking the input of the data modulated by modulator 46 to the head when the head deviates from the tracks of a disc.

Figure 5:
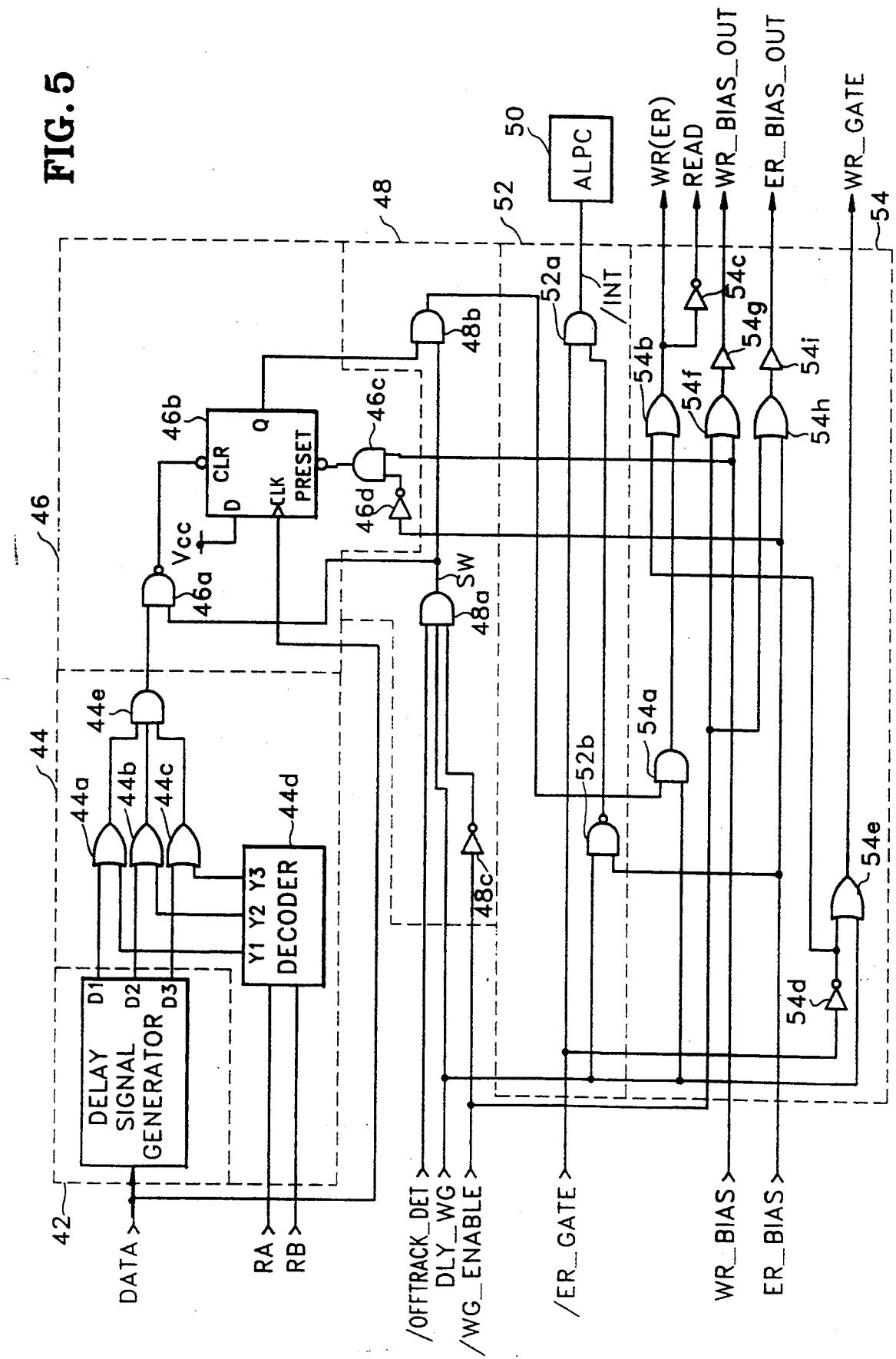
FIG. 5 is a circuit diagram of one embodiment of the apparatus shown in FIG. 4.

Referring to FIG. 5, delay signal generator 42 outputs data signals D1, D2 and D3 which are triggered by the leading edge of the recording data and whose trailing edges are delayed by delay periods dt1, dt2 and dt3 from the trailing edges of the recording data.

Selector 44 comprises first, second and third OR gates 44a, 44b and 44c for receiving delayed data D1, D2 and D3 generated from delay signal generator 42 via one input port, a decoder 44d for generating three selection signals Y1, Y2 and Y3 (hereinafter referred to as "selection signal Y1Y2Y3") according to signals RA and RB which indicate head positions (data recording portions) among the three areas divided along the radius of the disc, as shown in FIG. 1, to provide the generated selection signals to the other input port of first, second and third OR gates 44a, 44b and 44c, and an AND gate 44e for receiving the outputs of first, second and third OR gates 44a, 44b and 44c and providing the outputs as the output of selector 44.

Modulator 46 comprises a NAND gate 46a for receiving the output of selector 44, a D flipflop 46b for receiving the output of NAND gate 46a via its clear port, receiving the recording data via its clock port and outputting the modulated data, an AND gate 46c for generating a preset signal for D flipflop 46b, and an inverter 46d.

Blocking portion 48 comprises an AND gate 48a for receiving a signal indicating the various abnormal states of a system and generating a signal SW for blocking the signal output frown modulator 46, an AND gate 48b installed between modulator 46 and the head for blocking the transmission to the head of the modulated data generated from modulator 46, according to the signal SW from AND gate 48a, and an inverter 48c. A driving signal generator 52 comprises AND gate 52a and NAND gate 52b for detecting the erasing state to generate a signal/INT which drives ALPC 50.

Prior to the operational description of the apparatus shown in FIG. 5, the function of the various signals thereof will be explained./OFFTRACK_DET is a signal generated when the head deviates from the tracks of a disc. DLY_WG is a signal for setting a delayed recording mode./WG_ENABLE is a signal for indicating the write protection state of a disc./ER_GATE is a signal for designating an erasing period. WR_BIAS and ER_BIAS are signals for setting the recording and erasing modes of the system. WR_BIAS_OUT is a signal for determining the writing bias direction of the laser diode. ER_BIAS_OUT is a signal for determining the erasing bias direction of the laser diode. WR_GATE is a signal for notifying the beginning point of a write operation./INT is a signal for driving ALPC 50. WR (or ER) and READ are signals for setting the writing (or erasing) and reading modes of the laser diode of the head. (Here, the slash (/) preceding the signal nomenclature indicates that these signals are effective in low logic. )

Delay signal generator 42 is synchronized with the recording data and generates delayed data having delay characteristics dt1, dt2 and dt3 as shown in FIGS. 3B, 3C and 3D. The delay characteristics dt1, dt2 and dt3 are carefully selected so as to correspond to predetermined area divisions of the disc, and represent the period from the trailing edge of recording data to the trailing edge of delayed data.

Selector 44 selects one among delayed data signals D1, D2 and D3 generated from delay signal generator 42 according to the positional information of the head with respect to the disc. The selector detects the predetermined area divisions of the disc according to signals RA and RB indicating information as to the distance between the head and the center of the disc, and selects and outputs delayed data corresponding to the detected area divisions. Here, RA and RB can be obtained by a position detector which detects the degree of movement of a slide motor which moves the head along the disc's radius, the degree of movement of a tone arm, or the fact that the head is located in a given divided portion.

For instance, when the present writing position (head position) is within the first area of FIG. 1, the signals applied to the RA and RB inputs are both logic "0," when the head position is in the second area, the applied signal is set to be RA=1 and RB=0, and when the head position is in the third area, the applied signal is RA=0 and RB=1. According to the above set values, if RA=0 and RB=0 (position "A"), when decoder 44d selects delayed data D1 having delay characteristic dt1, selection signal Y1Y2Y3 is output as "011." If RA=1 and RB=0 (position "B"), when the decoder selects delayed data D2 having delay characteristic dt2, selection Y1Y2Y3 is output as "101." If RA=0 and RB=1 (position "C"), when the decoder selects delayed data D3 having delay characteristic dt3, selection signal Y1Y2Y3 is output as "110."

Accordingly, when selection signal Y1Y2Y3 output from decoder 44d is "011," delayed data D1 having delay characteristic dt1 is output via first OR gate 44a and high signals are output via second and third OR gates 44b and 44c. Since the output signals of second and third OR gates 44b and 44c (among first, second and third OR gates 44a, 44b and 44c) are both set to be high-logic, the output of AND gate 44e is determined by the signal output from first OR gate 44a. Thus AND gate 44e outputs delayed data D1 having delay characteristic dt1 and output from first OR gate 44a. Similarly, when selection signal Y1Y2Y3 output from decoder 44d is "101," AND gate 44e outputs delayed data D2 having delay characteristic dt2, and when selection signal Y1Y2Y3 output from decoder 44d is "110," AND gate 44e outputs delayed data D3 having delay characteristic dt3.

Modulator 46 having D flipflop 46b performs the modulation of the recording data according to the delayed data. The recording data is applied to the clock port of D flipflop 46b. The delayed data selected by selector 46 is applied to the clear port after being inverted by a later-mentioned NAND gate 46a. Hig-Mogic (e.g., +5 V) power voltage (Vcc) is applied to the data input.

At the leading edge of the recording data applied to the clock port, D flipflop 46b transfers the high-logic power voltage applied to the data input to the Q output, to provide a high-logic output. At the leading edge of the signal applied to the clear port, the D flipflop clears the output state to low logic. Therefore, modulated data which maintains a logic high state from the leading edge of the recording data to the trailing edge of the delayed data is output from the Q port of D flipflop 46b. The output of AND gate 48c is applied to the preset port. WR_BIAS and ER_BIAS inverted by inverter 46d are applied to AND gate 48c. In the writing mode, since WR_BIAS is set to be high logic, ER_BIAS is set to be low logic, and high logic is applied to the preset port of D flipflop 46b via AND gate 46c and inverter 46d, D flipflop 46d operates normally. Meanwhile, in the erasing mode, since WR_BIAS is set to be low logic and ER_BIAS is set to be high logic, D flipflop 46d is preset. Thus, in the erasing mode, the preset data output from D flipflop 46b is recorded.

Blocking portion 48 blocks the modulated data provided from modulator 46 to the head when abnormal conditions occur wherein recording to the disc must be blocked. The blocking portion operates when/WR_ENABLE, DLY_WG and/OFFTRACK_DET are applied. Inverter 48c inverts WG_ENABLE to supply it to AND gate 48a.

When a write-protected disc is loaded, WG_ENABLE is set to be high logic, and when a disc without write protection is loaded, WG_ENABLE is set to be low logic. When the writing mode is set and then a predetermined time passes, DLY_WG is set from low logic to high logic. When the head precisely traces the tracks on disc,/OFFTRACK_DET is set to be high logic, and in the reverse case,/OFFTRACK_DET is set to be low logic. Thus, when abnormal conditions do not occur and delayed writing control signal is applied, AND gate 48a (receiving the inverted/WG_ENABLE, the DLY_WG and the /OFFTRACK_DET signals) outputs a logic high.

The operation of blocking portion 20 will be described in the state in which abnormal conditions do not occur. If DLY_WG is not generated, since the output signal of AND gate 48a is low logic, AND gate 48b outputs low logic regardless of the output of modulator 46. If DLY_WG is generated, since the output signal of AND gate 48a is high logic, AND gate 48b outputs the output signal of modulator 46. Meanwhile, since the output signal of AND gate 48a of blocking portion 48 is applied to the other input port of NAND gate 46a of modulator 46, when abnormal conditions occur, the signal output from the Q port of D flipflop 46b via NAND gate 46a is cleared.

ALPC 50 controls the output of the laser diode of the head usually when the system is reset. As mentioned before, in the conventional method, according to the areas in which data is to be recorded, the output of the laser diode is controlled by ALPC 50. However, in the present invention, since the data is modulated before recording, the driving of ALPC 50 according to the positions at which the data is to be recorded is not required. Sometimes, if defects are created in ALPC 50 during the operation of a system, trouble may arise during the recording and erasing.

In order to prevent this, in the present invention, during the erasing mode, ALPC 50 is driven to control the output of the laser diode of the head. With /ER_GATE applied to one input port of AND gate 52a, a driving signal (/INT) is applied to ALPC 50 via driving signal generator 52. Then, ALPC 50 controls the output of the laser diode. The output signal of NAND gate 52b is applied to the other input of AND gate 52a, and DLY_WG and ER_BIAS are applied to NAND gate 52b. Therefore, even when DLY_WG is not generated and merely ER_BIAS is generated, ALPC 50 still operates.

Mode setting portion 54 of FIG. 5 generates a signal for controlling the recording, erasing and playback modes of the laser diode, according to the DLY_WG signal, the output signal of blocking portion 48, and the WR_BIAS and ER_BIAS signals.

During the writing mode, mode setting portion 54 receives the data output from blocking portion 48 and outputs data via AND gate 54a and OR gate 54b. The writing mode signal WR and reading mode signal READ of the laser diode are set according to the signal output from blocking portion 48. During the erasing mode,/ER_GATE is output via inverter 54c and OR gate 54b. READ is complementarily set with respect to WR or erasing mode signal ER of the laser diode, which is accomplished by inverter 54c. WR_GATE is generated when DLY_WG is generated (or when-/ER_GATE is not generated) via inverter 54d and AND gate 54e.

WR_BIAS._OUT for determining the writing bias direction of the laser diode is generated by OR gate 54f which receives/WR_ENABLE and WR_BIAS and buffer 54g which receives the output signal of OR gate 54f. When write protection is not used, since WR_ENABLE is applied as low logic, the logic of the output signal of OR gate 54f is determined by the logic state of the WR_BIAS signal. Thus, the direction of the writing bias is determined by the WR_BIAS signal. ER_BIAS_OUT for determining the erasing bias direction is generated by OR gate 54h which receives/-WR_ENABLE and ER_BIAS and buffer 54i which receives the output signal of OR gate 54h. When write protection is not used as in the case of determining the erasing bias direction, since WR_ENABLE is applied as low logic, the logic of the output signal of OR gate 54h is determined by the logic state of the ER_BIAS signal. Thus, the direction of the erasing bias is determined by the ER_BIAS signal.

The logic states of the above-mentioned various signals can be varied according to the conditions of a system, and accordingly, the construction regarding the logic devices can be changed so as to obtain an output signal corresponding to changes in the logic of an input signal.

As described above, since the disc recording apparatus of the present invention adjusts the composition rate of recording states corresponding to the high and low logic states of recording data according to the recording positions, the falling off of the C/N ratio of the recording data on the periphery of disc can be prevented. Further, when abnormal states occur, the output of the recording data can be blocked so that if the head deviates from the recording track, adjacent tracks are not affected.

Furthermore, since the disc recording apparatus of the present invention drives the ALPC during the erasing mode, the recording power of the head can be controlled by the ALPC before the recording mode.

What is claimed is:

1. In an apparatus for recording modulated data having two transition states consisting of leading and trailing edges on the tracks of a disc rotating at a predetermined angular velocity via a head, an apparatus for recording the modulated data based on an input data, comprising:

means for generating a plurality of delayed data whose leading edge transitiens are synchronized with respect to a transitional state of the input data and whose trailing edge transitions are delayed with respect to the opposite transitional state of said input data according to predetermined delay characteristics:

means for selecting one of the plurality of delayed data generated from said delayed data generating means according to the positions at which the data is to be recorded on the disc; and means for modulating the input data in accordance with said selecting means and providing the modulated data to the head.

2. An apparatus for recording modulated data as claimed in claim 1, further comprising:

means for controlling the recording power of the head; and means for driving said controlling means in the erasing state of the head.

3. An apparatus for recording modulated data as claimed in claim 1, further comprising means for blocking the input of the modulated data generated from said modulating means to the head when the head deviates from the recording tracks.

4. A method of recording data by a head on a disc rotating at a predetermined angular velocity, comprising the steps of:

determining a position of the head relative to the center of the disc;

increasing a duty factor of an input data based on the position of the head, as the head is moved away from the center of the disc; and recording the data of increased duty factor on the disc at the position determined by the determining step, wherein the data to be recorded on the disc and the input data have low and high states, and leading transition edges from a low state to a high state of the data to be recorded and input data are synchronized with each other.

5. The method of claim 4, wherein trailing transition edge from a high state to a low state of the data to be recorded is delayed relative to the input data such that the duty factor of the data to be recorded is increased.

6. The method of claim 4, wherein the step of varying the duty factor comprises:

generating a plurality of delayed data, each delayed data having leading transition edges from low to high states synchronous with the leading transition edges of the input data and having trailing transition edges from high to low states being delayed relative to the input data by predetermined delay characteristics;

selecting one of said plurality of delayed data based on the position of the head relative to the center of the disc; and modulating the input data in accordance with the selected delayed data; and providing the modulated data to the head for recording on the disc.

7. An apparatus for recording modulated data of an input data by a head onto a rotating disc, comprising:

means for determining a position of the head relative to the center of the rotating disc; and means for generating the modulated data by varying a duty factor of the input data based on the position of the head, said duty factor being increased as the head is moved away from the center of the disc, wherein the modulated data and the input data have low and high states, and leading transition edges from a low state to a high state of the modulated data and input data are synchronized with each other.

8. The apparatus of claim 7, wherein trailing transition edge from a high state to a low state of the modulated data is delayed relative to the input data such that the duty factor of the modulated data is increased.

9. The apparatus of claim 7, wherein the varying means comprises:

means for generating a plurality of delayed data, each delayed data having leading transition edges from low to high states synchronous with the leading transition edges of the input data and having trailing transition edges from high to low states being delayed relative to the input data by predetermined delay characteristics such that each of said plurality of delayed data has different duty factors;

means for selecting one of said plurality of delayed data based on the position of the head relative to the center of the rotating disc; and means for modulating the input data in accordance with the selected delayed data to output the modulated data.

* * * * *